United States Patent [19]

Witte

[11] 4,040,739
[45] Aug. 9, 1977

[54] METHOD AND DEVICE FOR GENERATING A SIGNAL DEPENDENT ON THE DISTANCE OF AN OBJECT IN AN OBJECT SPACE

[76] Inventor: Wolfgang W. Witte, Burgbergring 9, 777 Überlingen, Germany

[21] Appl. No.: 666,880

[22] Filed: Mar. 15, 1976

[51] Int. Cl.² .............................................. G01C 3/08
[52] U.S. Cl. ....................................... 356/4; 250/201; 356/168
[58] Field of Search ......................... 356/1, 168, 4, 5; 354/25; 250/201; 352/140

[56] References Cited

U.S. PATENT DOCUMENTS

| | | | |
|---|---|---|---|
| 3,599,552 | 8/1971 | Harvey | 354/25 |
| 3,653,762 | 4/1972 | Harvey | 356/4 |
| 3,781,110 | 12/1973 | Leitz et al. | 356/4 |
| 3,856,400 | 12/1974 | Hartmann | 356/4 |

Primary Examiner—S.C. Buczinski
Attorney, Agent, or Firm—Darbo, Robertson & Vandenburgh

[57] ABSTRACT

A light beam passes through a physical pattern of opaque and transparent areas and is projected into space to an image plane. Upon an object appearing at the image plane the pattern is reflected back to the physical pattern as a second pattern image. The optical system is such that, in part, this second pattern image is a reversal of the pattern. The physical pattern is on a rotating drum to produce relative motion between the second pattern image and the pattern. Light from the second pattern image which passes through the pattern is received by a photoelectric cell to generate a signal. By having the pattern in the form of a spiral and the width of the pattern correspond to the width of the light beam at the point where it intersects the beam, various distances can be detected.

24 Claims, 6 Drawing Figures

METHOD AND DEVICE FOR GENERATING A SIGNAL DEPENDENT ON THE DISTANCE OF AN OBJECT IN AN OBJECT SPACE

The invention relates to a method for generating a signal depending on the distance of an object in an object space by means of optical images. The invention relates also to devices for the carrying-out of this method.

In the simplest case, the signal may indicate, whether or not an object is positioned at a predetermined distance in the object space. This predetermined distance may be varied, until a certain object is detected, or the object space may be scanned continuously and cyclically from vicinity towards remoteness, in order to derive from the signal variations informations about structures in the object space. An example for the first mentioned case would be a safety device, which is affixed to an automatically movable vehicle, such as a crane or a transport cart running on rails, and which triggers a signal to stop the vehicle, if there is an obstacle in the path of the vehicle. Another application of a device of the present type operating with fixed, predetermined object distance is the protection of objects against theft. The "predetermined distance" would be the distance of the device from a wall located behind the object to be protected, the object being in the path of rays of the imaging optical system but at a distance different from the "predetermined distance". Upon removal of the protected object, the wall observed behind it would become the "object" and, as it is located at the predetermined distance, would trigger the signal. An application in which the predetermined distance is varied until a certain object is detected, would be the automatic range setting in photographic cameras. Periodic scanning of an object space is advantageous in an apparatus which may serve as an aid for blind persons to find their way. Another application of such a device would be the continuous automatic range setting of a motion picture camera shooting pictures of a moving object. It will be noted from these examples that devices of the present type have a wide range of application.

Devices of the present type are known, in which a physical pattern, such as a raster, is really imaged at a predetermined distance in the object space. This real image is, in turn, imaged backwards on the same pattern or an identical or complementary second pattern. A signal is generated by a radiation detector which is located in the returning path of rays behind the latter pattern (German Pat. No. 742,220 and German Pat. specification No. 1 902 687). If the object is not positioned at the predetermined distance, the imaging path of rays will form a light spot substantially without any structures on the object. In the returning path of rays, the pattern will be radiated through uniformly, which will result in a certain level of the detector signal. This level, in addition, is dependent on the diffuse reflectance of the object and on the distance of the object. If, however, the object is positioned at said predetermined distance, the physical pattern will be imaged on the surface of the object, so that brightly and less brightly illuminated area portions will appear thereon and will remit light correspondingly. The real image thus obtained is now imaged backwards on the physical pattern itself or on an identical pattern or a pattern complementary thereto. In the former cases the respective bright area portions of the image coincide with the transparent area portions of the physical pattern, whereby an increased light flux passes through the physical pattern. In the latter case the respective dark area portions of the image coincide with the transparent area portions of the physical pattern, whereby a considerably reduced light flux passes through the physical pattern. In all cases there is a signal level decreasing with increasing distance, a positive or negative peak being superimposed to this level at the "predetermined distance".

Apart from this, the signal level is also a function of the diffuse reflectance of the surface of the object and is also affected by stray radiation.

Thus in the prior art the signal amplitude or level alone does not give any information as to whether the object is positioned at the "predetermined distance". Instead the relation between signal amplitude and distance would be ambiguous due to the variation of the illumination with distance, even if the differences in the diffuse reflectance were neglected.

It is an object of the invention to produce an unambiguous signal in a method of the present type.

It is a more specific object of the invention to provide an aid for blind persons to find their way.

The method of the invention is characterized by the following steps:
  a. forming in said object space a real first pattern image having area portions of different optical characteristics;
  b. optically imaging said first pattern image as a second pattern image backwards on a physical pattern similar to said second pattern image;
  c. generating relative movement between said second pattern image and said physical pattern; and
  d. determining the variation of the radiation flux, from said object space and through said physical pattern, caused by said relative movement.

Thus in accordance with the basic concept of the invention a relative movement between the pattern image, imaged backwards on the physical pattern, and the physical pattern is generated. If the pattern image is blurred, thus actually is only a light spot, this relative movement will not cause any variation of the radiation flux, so that no signal will be produced. Only when a well-focused pattern image is formed on the physical pattern, indicating a well-defined distance of the object in the plane of the real pattern image formed in the object space, such a signal due to the relative movement will occur. Thus it is not necessary to take a background signal into consideration, which is dependent on distance and diffuse reflectance. A device for the carrying out of the method of the invention is characterized by
  a. image forming means for forming in said object space a real first pattern image having area portions of different optical characteristics;
  b. a physical pattern having a configuration similar to that of said first pattern image formed by said image forming means;
  c. an optical system for imaging said real first pattern image as a second pattern image backwards on said physical pattern, and
  d. means for generating relative movement of said second pattern image and of said physical pattern.

Preferably the device comprises also
  e. detector means exposed to the radiation flux, which passes from said object space through said physical pattern, to produce a detector signal analog to said radiation flux, and f. evaluation means to which the detector signal is applied and which are arranged to produce a signal analog to the variation of said radiation flux due to said relative movement of said second pattern image and said physical pattern.

A preferred embodiment of the invention, which is particularly useful as an aide for blind persons to find their way, comprises an imaging optical system defining a path of rays and an optical axis;

a rotatable, transparent pattern carrier having a curved surface, which carrier in each angular position has an associated portion of said surface extending into said path of rays, the distance of the respective extending portion from said imaging optical system varying progressively in a range as a function of the angle of rotation and, at the end of said range, returning instantly to the beginning of the range, the portion of the surface extending into the path of rays, apart from this, moving substantially transversely to the optical axis during the rotary movement, a physical pattern provided on said surface and having transparent and opaque area portions alternating in the direction of said transverse movement;

light source means for illuminating said physical pattern;

a reflecting surface in the path of rays between said imaging system and said physical pattern in a plane containing said optical axis;

a radiation detector for generating a signal indicative of the radiation flux falling thereon;

reflecting means in the path of rays on the side of the physical pattern remote from the imaging optical system, said reflecting means being arranged to direct at least part of the radiation from the object space and passing through said physical pattern to said radiation detector, and evaluation means responding to the a.c. component of said detector signal.

An embodiment of the invention will now be described with reference to the accompanying drawings.

Figures 1, 4, 5:
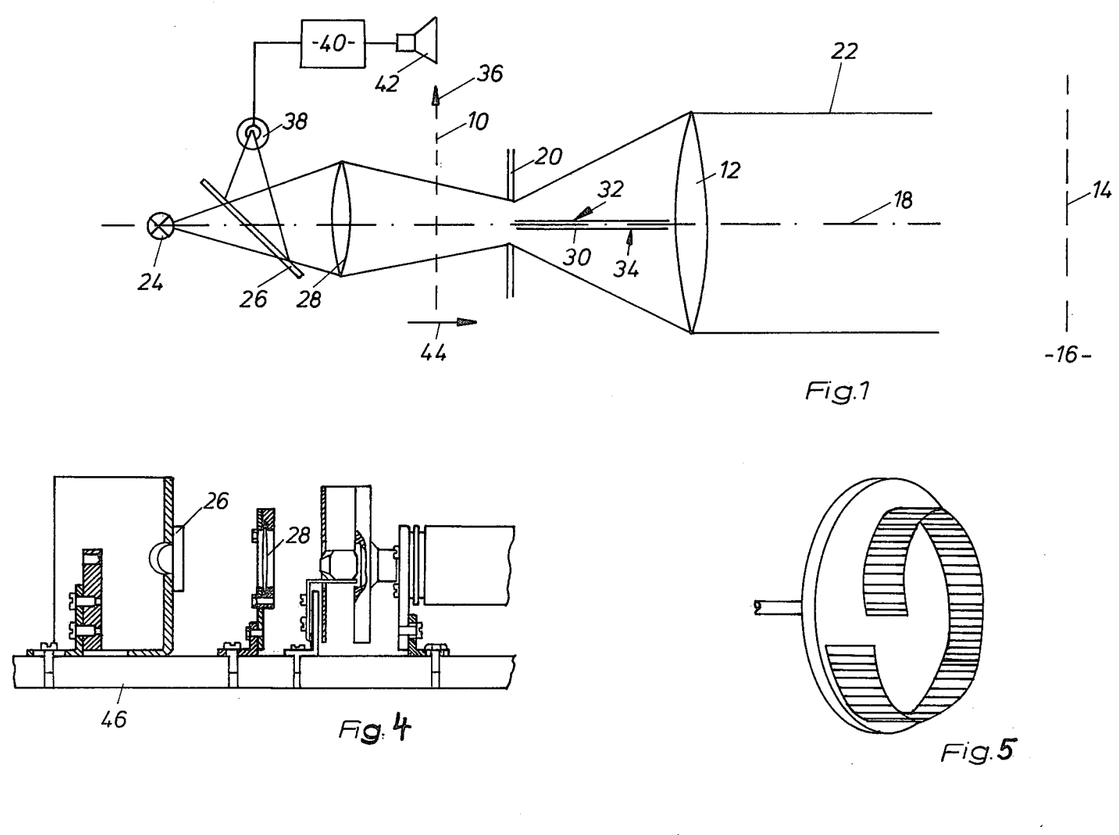
FIG. 1 is a schematic illustration of the path of rays in a device of the invention.
FIG. 4 is an end elevational view of the device of FIG. 2.
FIG. 5 is a perspective view of the pattern carrier in the embodiment of FIGS. 2 to 4.

Referring to FIG. 1, numeral 10, designates a physical pattern consisting of transparent and opaque portions. An imaging optical system in the form of a lens 12 images the physical pattern 10 as a first pattern image 14 in an object space 16. The lens 12 determines an optical axis 18. A beam limiting light stop 20 is positioned intermediate the physical pattern 10 and the lens 12, the light stop being imaged by the lens 12 in the object space 16. Preferably the image of the light stop 20 is formed at a distance corresponding to the operating range of the device. Due to the light stop 20 the imaging rays form a slightly convergent beams.

The pattern 10 is illuminated by a light source 24 from the light source the rays pass through a partly transparent mirror 26 arranged at an angle with respect to the path of rays and a condensor lens 28.

A mirror plate 30 is positioned in the optical axis 18 between the lens 12 and the light stop 20. The mirro plate has a reflecting, plane surface 32 on top in FIG. 1, while the bottom surface 34 is non-reflecting. Imaging of the pattern 10 in the plane of the first pattern image 14 is partly effected directly through the lens 12, and partly by the lens 12 after reflection of the rays by the reflecting surface 32. Thus the first pattern image 14 is composed of two mutually inverse images of the physical pattern 10, one of which has been formed directly and the other one via the reflecting surface. In similar manner the first pattern image 14 is imaged backwards as a second pattern image, when a diffusely reflecting surface is positioned in the plane of the first pattern image. The second pattern image is also composed of two components: of which one is the image of the physical pattern formed directly by the lens 12 in the plane of the first pattern image and is again imaged backwards directly on the physical pattern 10. This image is always coincident with the physical pattern 10. The same is true for the image which was formed via the reflecting surface 32 in the plane of the second pattern image 14 and which returns to the physical pattern via the same path which includes the reflecting surface. A second image is, however, formed on the pattern 10 by the rays which form the image either via the reflecting surface on the forward path and directly on the return path or, the other way round, directly on the forward path and via the reflecting surface on the return path. This latter image is upside-down with respect to the physical pattern 10. If, for example, the physical pattern 10 were composed of alternating transparent and opaque grating lines, at a right angle to the plane of the paper in FIG. 1, the radiation flux passing through the physical pattern lo would be dependent on the relative positions of the physical pattern lo and of the pattern image formed in the plane thereof. When the physical pattern is moved upwards in FIG. 1, in the sense of the arrow 36, the upside-down pattern image will move downwards. Thereby alternatingly dark and bright portions of the upside-down pattern image will coincide with the transparent strips of the physical pattern lo, and, consequently, there will be cyclic variation of the radiation flux passing through the physical pattern 10. This occurs, however, only if a diffusely reflecting surface is positioned in the plane of the first pattern image 14, so that a well-focused backward image can be formed. If the reflecting or remitting surface deviates from the plane of the first pattern image 14, only a substantially uniformly illuminated light spot will be formed on this surface. Consequently a substantially homogeneous light beam will pass through the physical pattern 10 in the return path of rays such, a beam will not be affected by the movement of the pattern 10, and there will be no cyclic variation of that radiation flux.

The light passing through the physical pattern 10 from the object space 16 is concentrated on a radiation detector 38 by the condensor lens 28 and the partially transparent mirror 26, which reflects part of this light. The a.c. component of the detector signal thus obtained, which component results from the cyclic variation of the radiation flux, is applied to a loud-speaker 42 through an amplifier 4o and generates a tone. In addition, the physical pattern 10 may be moved in the direction of the arrow 44, in order to scan the distance range.

FIGS. 2 to 6 illustrate the constructional design.

Figure 2:
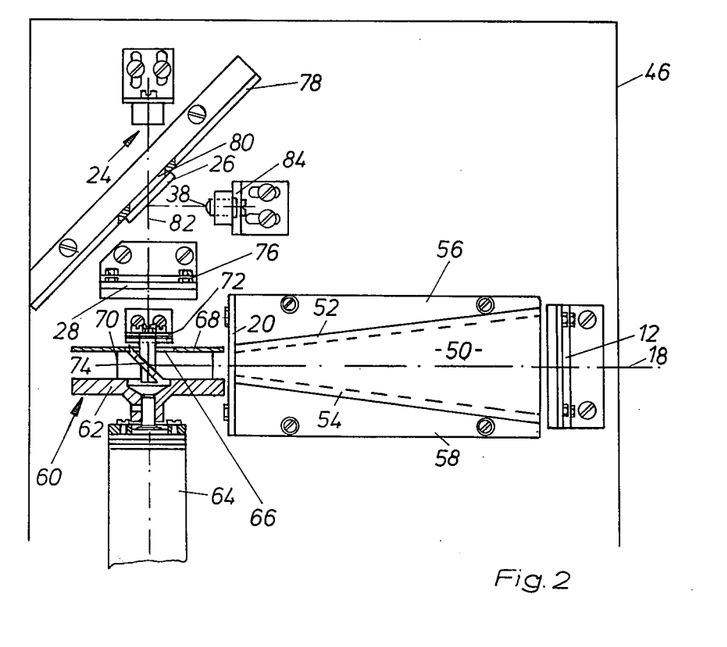
FIG. 2 is a plan view of a practical embodiment of a device shown in FIG. 1.
Figure 3:
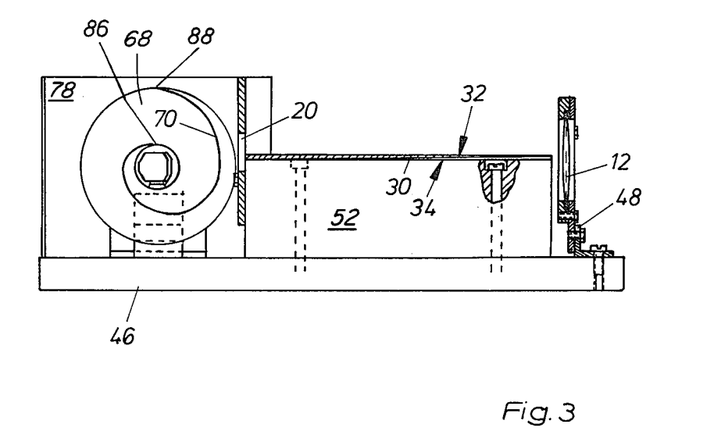
FIG. 3 is a section substantially along axis 18 of FIG. 2.

The lens 12 is held in a bracket 48 secured to a loose plate 46. Adjacent the lens 12 a funnel-shaped passage 50 is defined by two side elements 52, 54, which have base portions 56,58 screwed to the base plate 46. The side elements extend substantially to the height of the optical axis 18 of lens 12. The mirror plate 30 is positioned on the side elements 52,54, the upper surface of mirror plate 30 being reflecting and the bottom surface thereof being non-reflecting. The light stop 20 is located adjacent the narrow end of the funnel-shaped passage.

A pattern carrier 60 comprises parallel disc 62 and 68 which are rotatable about an axis normal to the optical axis 18 and are driven by a motor 64, Disc 68 has a large central aperture 66. A spiral-shaped transpartent strip 70 carrying the physical pattern 10 to be described hereinbelow extends between the discs 62 and 68 is secured thereto and rotates with the discs.

A mirror holder 72 mounted on the base plate 46 extends into the aperture 66 and supports a deflecting mirror positioned at an angle of 45° with respect to the optical axis 18. The path of rays is deflected through a right angle by the deflecting mirror 74 so that it emanates from the aperture 66 along the axis 82 of rotation of disc 62.

The lens 28 is positioned in the deflected path of rays in a bracket 76. A partition wall 78, which is also mounted on the base plate, has an aperture 80 therethrough. The partially transparent mirror 26 closes the aperture 80. The light source 24 is located on the optical axis 82 of the deflected path of rays beyond the partially transparent mirror 26, while the radiation detector 38, i.e. an appropriate photoelectric detector, is mounted in a bracket 84 in mirror image relation thereto with respect to mirror 26.

The spiral-shaped transparent strip 70 bearing the physical pattern 10 intersects the path of rays along axis 18. As seen in FIGS. 2 and 3, the strip 70 is of spiral configuration about its axis of rotation. Thus as the disc 60 rotates the position of the respective portion of the strip 70 extending through the path of rays from the lens 12 is varied radially whereby the location of the real image 14 in the object space is varied accordingly. This is the movement of the physical pattern 10 represented by arrow 44 in FIG. 1. The location of respective portion of the strip 70 extending into the path of rays moves from a left end position in FIGS. 2 and 3 corresponding to section 86 of the strip 70 to a right end position corresponding to section 88 of the strip and then returns instantly to the left end position.

The rotation of the strip also results in a movement of the strip 70 in a peripheral direction and thus substantially at a right angle to the optical axis 18 of the path or rays. This movement corresponds to arrow 36 in FIG. 1.

Figure 6:
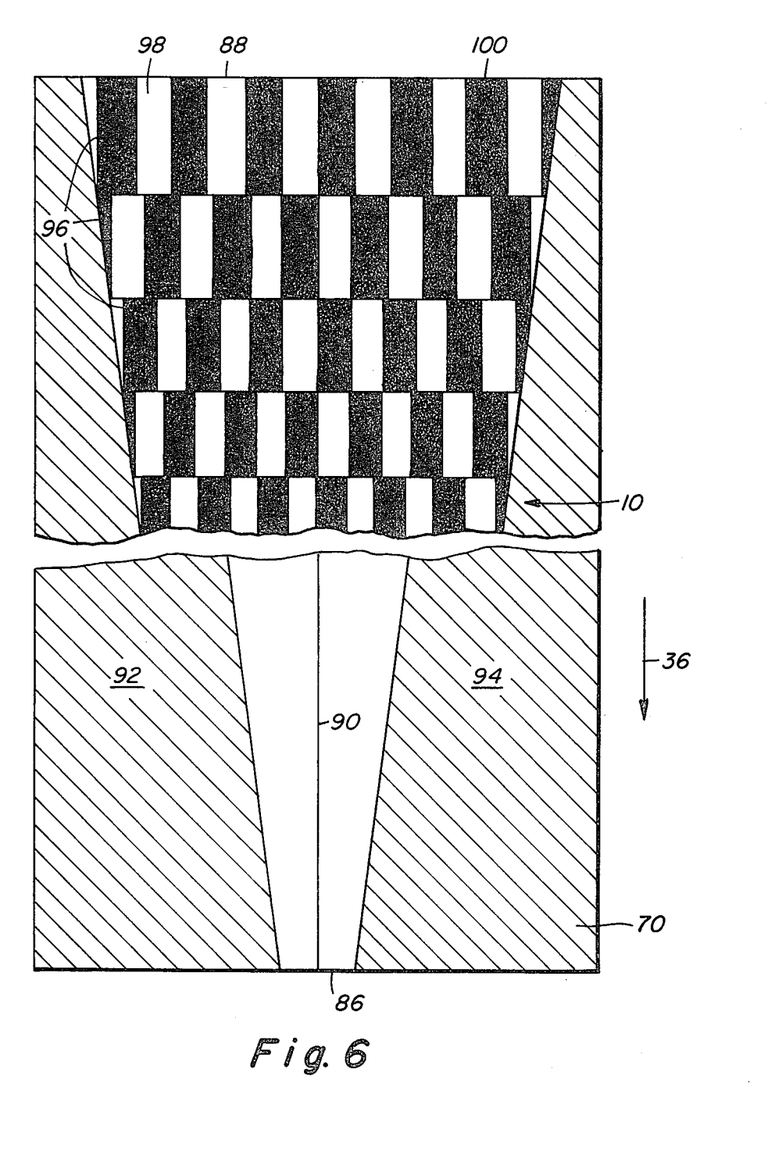
FIG. 6 is a development of the physical pattern in the embodiment of FIGS. 2 to 4.

The physical pattern 10 is shown in FIG. 6 at an enlarged scale.

The pattern 10 has the overall shape of an elongated trapezoid, which extends along the strip 70 symmetrical with respect to a longitudinal center line 90. The areas 92, 94 of the strip 70 outside the pattern 10 are opaque. The shape of the spiral in which the pattern is positioned, and thus the shape of the trapezoid, is such that the width of the respective portions of the pattern 10 extending through the path of rays, during the movement along the optical axis 18 is substantially in conformity with the beam width of the light beam converging from the lens 26 towards the light stop 20.

The pattern 10 itself is chessboard-like, i.e. it contains "lines" 96 (horizontal strips in FIG. 6) extending transversely to the center line 90 and having alternating transparent and opaque area portions 98 and 100, respectively. The area portions 98, 100 are so dimensioned that the means transparency (the ratio of transparent area to opaque area per line) is the same in all lines 96. This prevents modulation of the radiation flux falling on the radiation detector 38 already without well-focussed imaging of the first pattern image 14 on a diffusely reflecting surface just due to the fact, that the beam cross section during the passage of the pattern therethrough might cover alternatingly more or fewer opaque area portions. With a ideal chessboard-pattern, for example — if the variation of the width of the pattern is disregarded for a moment — there are two opaque area portions and three transparent area portions in one line and three opaque area portions and two transparent area portions in the next line. This would result in such a modulation.

The same problem would arise with simple alternating transparent and opaque strips transverse to the direction of movement, if the beam cross section would cover, for example, alternatingly two opaque strips and one transparent strip or one opaque strip and two transparent strips. This would result in an undesirable background ripple. This can be avoided by a two-dimensional design of the pattern 10.

In the embodiment shown the side of the pattern 10 on the left of the longitudinal center line 90 is complementary to the side on the right of the longitudinal center line. Adjacent the longitudinal center line 90 there is, in each line, a transparent area portion on the left side and an opaque area portion on the right side or vice versa. The dimensions of the area portions transverse to the direction of movement 36 are so selected in each that the same mean transparency results for all lines 96.

The longitudinal dimensions of the area portions in the direction of movement 36 vary progressively along the trip 70. These longitudinal dimensions determine the angular displacement between two neighboring positions of the pattern 10, in one of whch the physical pattern 10 and the upside down pattern image are substantially coincident, and in the order one of which pattern and pattern image are substantially complementary to each. Thus with a given speed of the motor 64 these longitudinal dimensions determine the frequency of the signal, which is obtained, then the real first pattern image 14 falls on a diffusely reflecting surface.

The dimensions of the area portions 98 and 100 transverse to the direction of movement 36 are noticably smaller than the dimensions in the direction of movement. The transverse dimensions determines the distance resolution, i.e., the range of distances in the object space in which the diffusely reflecting surface of an object will cause the generation of an a.c. signal from the radiation detector. If, for example, the distance of the object with its diffusely reflecting surface is 2 meters,, a pattern image of sufficient structure will still appear on this surface and will be imaged backwards on the physical pattern, if the image plane proper of the first pattern image varies, for example, betwen 1.90 meters and 2.20 meters. Outside this range the pattern structures flow together in the direction transverse to the direction of movement and result in a spot of substantially uniform brightness, which no longer causes fluctuating light and a.c. signals at the radiation detector Thus the smallest dimensions of the two-dimensional pattern determine the distance resolution of the device.

This distance resolution can be selected within the distance range in accordance with the requirements and can be varied with distance, if required. As mentioned above, the dimensions of the area portions in the direction of movement, on the other hand, determine the frequency of the a.c. signal produced when an object is detected.

In the illustrated preferred embodiment of the invention, the dimensions of the area portions 98, 100 are also progressively varied in the direction of movement, whereby the frequency of the detector signals is varied as a function of the distance of the object. Thus, for example, a near object, on which section 86 of the pattern is imaged, will be signalled by a higher frequency of the detector signal than a remote object, on which section 88 of the pattern 10 is imaged, because the dimensions of the area portions 98, 100 in longitudinal direction of the strip 70 are smaller in section 86 than in section 88.

Thus the rotating, spiral-shaped strip bearing the two-dimensional pattern 10 fulfils the following functions at the same time:

a. It causes movement of the pattern 10 transverse to the optical axis 18 of lens 12.
b. It causes a cyclic movement of the pattern 10 along the optical axis 18 and thus a cyclic scanning of the distance range in the object space.
c. The longitudinal dimensions of the area portions 98, 100 determine the frequency of the detector signal obtained, when an object is being detected, whereby the detector signal itself contains a mark indicating, with which moment of the scanning cycle the respective signal is associated.
d. The transverse dimensions of the area portions 98, 100 determine the distance resolution, whereby the distance resolution may be selected sufficiently high, without the necessity of either making the scanning frequency, with which the distance range of the object space is scanned, undesirably low, or getting an undesirably high frequency of the detector signal.

The latter is important, when the device is to be used as an aid for blind persons to find their way, as in this case the detector signals appearing in the loud-speaker 42 should be in the audio-frequency range and should extend over not more than one octave.

On the other hand scanning of the distance range of the object space should be effected at relatively high frequency so that informations about the structure of the object space are available in quick sequence and the object space may be scanned also by sweeping movement from right to left or from top to bottom. This requirement might be in contradiction to the requirement of high distance resolution.

In a device used as an aid for blind persons to find their way, infrared radiation should preferably be used, in order to avoid blinding of other persons. Preferably the variation of the returning radiation flux with distance is compensated for by some kind of attenuator, whereby the signal amplitude will become a measure of the diffuse reflectance of the detected object surface.

A preferred embodiment of the invention has been described hereinbefore. The invention may, however, be reduced to practice in various other forms.

For example it is possible to form the first pattern image by means of another physical pattern than that physical pattern, on which the first pattern image is imaged backwards. Instead of imaging the pattern upside-down with a continuous movement of the pattern, there may then be an upright image formation of one pattern on the other, one pattern carrying out an oscillating movement. Instead of having one pattern carry out an oscillating movement, the pattern iftself may be stationary, and a cyclic lateral displacement of the pattern image formed may be caused by a plane-parallel plate extending cyclically into or passing cyclically through the path of rays.

Instead of cyclically scanning the distance range of the object space a fixed or, if desired, adjustable distance may be selected and a signal may be generated,, when an object is positioned at this distance. Furthermore it is possible, to replace the spiral-shaped strip 70 by a "winding stairs " — shaped pattern carrier, which rotates about an axis of rotation parallel to the optical axis 18, various edge portions of this pattern carrier extending successively into the path of rays.

Instead of marking the position of the detector signal within the scanning cycle, in the manner described hereinbefore, by the frequency of the signal, this position may be determined also in other ways. One possibility is to apply the detector signal, after separation and rectification of its a.c. component resulting in a peak at a moment of the scanning cycle depending on the object distance, to a narrow band filter tuned to the distance scanning frequency. Thereby a sine-shaped a.c. voltage is obtained the phase of which is a measure of the object distance. This phase can, for example, be determined by demodulating the a.c. voltage by means of two synchronous demodulators operating a quarter period out of phase. These synchronous demodulators produce two d.c. voltages proportional to sine and cosine of the phase angle. A measure of the object distance may be derived from the ratio of these d.c. voltages.

Another possibility would be to generate an electric auxiliary quantity, which varies systematically in the same manner during each distance scanning cycle. The auxiliary quantity may, for example, be the voltage across a slowly charged capacitor, which is discharged quickly at the beginning of each distance scanning cycle. In the maximum of the detector signal this auxiliary quantity is stored an applied to an appropriate electronic circuit. Alternatively, the systematic variation of the auxiliary quantity may be initiated in the maximum of the detector signal, the auxiliary quantity being picked-off at the end of the cycle.

Instead of an acoustic output signal any other type of output signal may be generated depending on the kind of application. Even in a device serving as an aid for blind persons to find their way, instead of the acoustic output signal, another non-optical signal may be produced, for example a signal in the form of mechanical vibrations.

What I claim is:

1. A method for generating a signal dependent on the distance of an object in an object space, comprising the steps of
   a. forming in said object space a real first pattern image having area portions of different optical characteristics;
   b. optically imaging said first pattern image as a second pattern image backwards on a physical pattern similar to said second pattern image;

c. generating relative movement between said second pattern image and said physical pattern; and d. determining the variation of the radiation flux, from said object space and through said physical pattern, caused by said relative movement and producing a signal based on that determination.

2. A method as set forth in claim 1, wherein the image distance of said first pattern image is varied to determine the distance of the object, the occurrence of said variation of the radiation flux caused by said relative movement indicating that said image distance is then equal to the distance of the object.

3. A method as set forth in claim 2, characterized in that said image distance is varied continuously only until a variation of the radiation flux caused by said relative movement occurs.

4. A method as set forth in claim 2, characterized in that said image distance is varied in a repetitive cycle within a predetermined range and a part of the cycle, when a variation of the radiation flux due to said relative movement occurs, is determined to signify the distance of the object.

5. A mehtod as set forth in claim 4, wherein the radiation flux is characteristic representing the magnitude of the image distance, with said characteristic varying as the image distance varies.

6. A method as set forth in claim 1, wherein a substantially cyclical variation of said radiation flux is caused by the relative movement of said second pattern image and said physical pattern.

7. A device for generating a signal depending on the distance of an object in an object space, comprising:

a. image forming means for forming in said object space a real first pattern image having area portions of different optical characteristics;

b. a physical pattern having a configuration similar to that of said first pattern image formed by said image forming means;

c. an optical system for imaging said real first pattern image as a second pattern image backwards on said physical pattern;

d. means for generating relative movement of said second pattern image and of said physical pattern; and e. means exposed to the radiation flux, which passes from said object space and onto said physical pattern, for producing a detector signal in response to changes of said flux.

8. A device as set forth in claim 7 wherein said detector signal is an analog of said radiation flux which passes through said physical pattern, and further including f. evaluation means to which the detector signal is applied and which are arranged to produce a signal analog to the variation of said radiation flux due to said relative movement of said second pattern image and said physical pattern.

9. A device as set forth in claim 7, wherein said image forming means comprise said physical pattern and said optical system, wherein said means for generating relative movement of said second pattern image and said physical pattern comprises drive means for moving said physical pattern and including image-reversing mirror means in the return path of rays from said second pattern image to said physical pattern 10. A device as set forth in claim 9, characterized in that said physical pattern comprises area portions of a first and of a second optical characteristic alternating in the direction of said relative movement.

11. A device as set forth in claim 10, characterized in that said area portions of said physical pattern having a first and a second optical characteristic alternate also in a direction transverse to the direction of said relative movement, the ratios of the area portions having said first optical characteristic to the area portions having said second optical characteristic being the same in all area strips extending transversely to the direction of said relative movement.

12. A device as set forth in claim 7 wherein said image forming means comprise means for varying the image distance of said first pattern image.

13. A device for generating a signal depending on the distance of an object in an object space, comprising:

an imaging system defining a path of rays and an optical axis;

a rotatable, transparent pattern carrier having a curved surface, which carrier in each angular position has an associated portion of said surface extending into said path of rays, the distance of the respective extending portion from said imaging optical system varying progressively in a range as a function of the angle of rotation and, at the end of said range, returning instantly to the beginning of the range, the portion of the surface extending into the path of rays, apart from this, moving substantially transversely to the optical axis during the rotary movement;

a physical pattern provided on said surface and having transparent and opaque area portions alternating in the direction of said transverse movement;

light source means for illuminating said physical pattern;

a reflecting surface in the path of rays between said imaging optical system and said physical pattern in a plane containing said optical axis;

a radiation detector for generating a signal indicative of the radiation flux falling thereon;

reflecting means in the path of rays on the side of the physical pattern remote from the imaging optical system, said reflecting means being arranged to direct at least part of the radiation from the object space and passing through said physical pattern to said radiation detector, and evaluation means responding to an a.c. component of said detector signal.

14. A device as set forth in claim 13, characterized in that the imaging optical system comprises a lens, a beam limiting light stop being located between said pattern carrier and the focal point of said lens and being imaged really in the object space.

15. A device as set forth in claim 14 wherein said reflecting surface is located between said lens and said light stop.

16. A device as set forth in claim 13 wherein said pattern carrier is a spirally bent strip which is mounted for rotation about an axis normal to the optical axis for said imaging optical system.

17. A device as set forth in claim 16 wherein a stationary deflecting mirror is located on the axis of rotation of the pattern carrier to deviate the path of rays.

18. A device as set forth in claim 13, characterized in that the dimensions of the transparent and opaque area portions in the direction of said relative movement vary progressively as a function of the distance from which the area portions to the imaging optical system when the area portions are in the path of rays.

19. A device as set forth in claim 18 characterized in that the area portions of said physical pattern are alternatingly transparent and opaque also in the direction normal to the direction of said relative movement, the mean transparency being the same in each area strip extending transversely to the direction of said relative movement.

20. A device as set forth in claim 19 characterized in that the dimensions of each area portion in the direction of said relative movement are larger than the dimensions normal thereto.

21. A device as set forth in claim 19, characterized in that adjacent a center line of the pattern extending in the direction of said relative movement, a transparent area portion is located on one side and an opaque area portion is located on the other side, in each transverse area strip.

22. A device as set forth in claim 19, characterized in that the total width of the physical pattern transverse to the direction of said relative movement is selected to match, at each distance, substantially the beam cross section.

23. A device as set forth in claim 13, characterized in that said reflecting means comprises a partially transparent mirror located between light source and pattern at an angle with respect to said path of rays.

24. A device as set forth in claim 23 characterized in that a condenser lens is located between said partially transparent mirror and said physical pattern, said condenser lens, on one hand, concentrating a beam emanating from the light source on a beam limiting light stop between pattern carrier and imaging optical system, and, on the other hand, concentrating the radiation returned through the light stop over the partially transparent mirror on the radiation detector.

* * * * *

UNITED STATES PATENT AND TRADEMARK OFFICE
CERTIFICATE OF CORRECTION

PATENT NO. : 4,040,739
DATED : August 9, 1977
INVENTOR(S) : Wolfgang W. Witte

It is certified that error appears in the above-identified patent and that said Letters Patent are hereby corrected as shown below:

| | |
|---|---|
| Col. 3, l. 66 | "beams" should be --beam-- |
| Col. 4, l. 4 | "mirro" should be --mirror-- |
| Col. 4, l. 18 | delete the colon (:) after "components" |
| Col. 4, l. 19 | After "pattern" insert --10-- |
| Col. 4, l. 26 | insert --32-- after "surface" |
| Col. 4, l. 55 | insert a period (.) after "rays" and "such" should be --Such-- |
| Col. 5, l. 1 | "loose" should be --base-- |
| Col. 5, l. 11 | "disc" should be --discs-- |
| Col. 5, l. 13 | ", Dise" should be --. Disc-- |
| Col. 5, l. 16 | insert a comma (,) after "68" |
| Col. 5, l. 53 | "or" should be --of-- |
| Col. 6, l. 6 | "means" should be --mean-- |
| Col. 6, l. 38 | after "each" insert --line-- |
| Col. 6, l. 42 | "trip" should be --strip-- |
| Col. 6, l. 44 | "whch" should be --which-- |
| Col. 6, l. 46 | "order" should be --other-- |
| Col. 6, l. 48 | after "each" insert --other-- |
| Col. 6, l. 50 | "then" should be --when-- |

UNITED STATES PATENT AND TRADEMARK OFFICE
CERTIFICATE OF CORRECTION

Page 2 of 2

PATENT NO. : 4,040,739
DATED : August 9, 1977
INVENTOR(S) : Wolfgang W. Witte

It is certified that error appears in the above-identified patent and that said Letters Patent are hereby corrected as shown below:

| | |
|---|---|
| Col. 6, l. 61 | delete one comma (,) before "a pattern" |
| Col. 7, ls. 1, 2 | add a period (.) after "detector" |
| Col. 8, l. 16 | delete one comma (,) after "generated" |
| Col. 9, l. 23 | "mehtod" should be --method-- |
| Col. 9, l. 24 | after "is" insert --a-- |
| Col. 9, last line | insert a period (.) after "pattern" |
| Col. 10, l. 19 | after "imaging insert --optical-- |

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*